Dec. 6, 1949      F. D. RUGG      2,490,710
RAKE
Filed Jan. 26, 1946      2 Sheets-Sheet 1
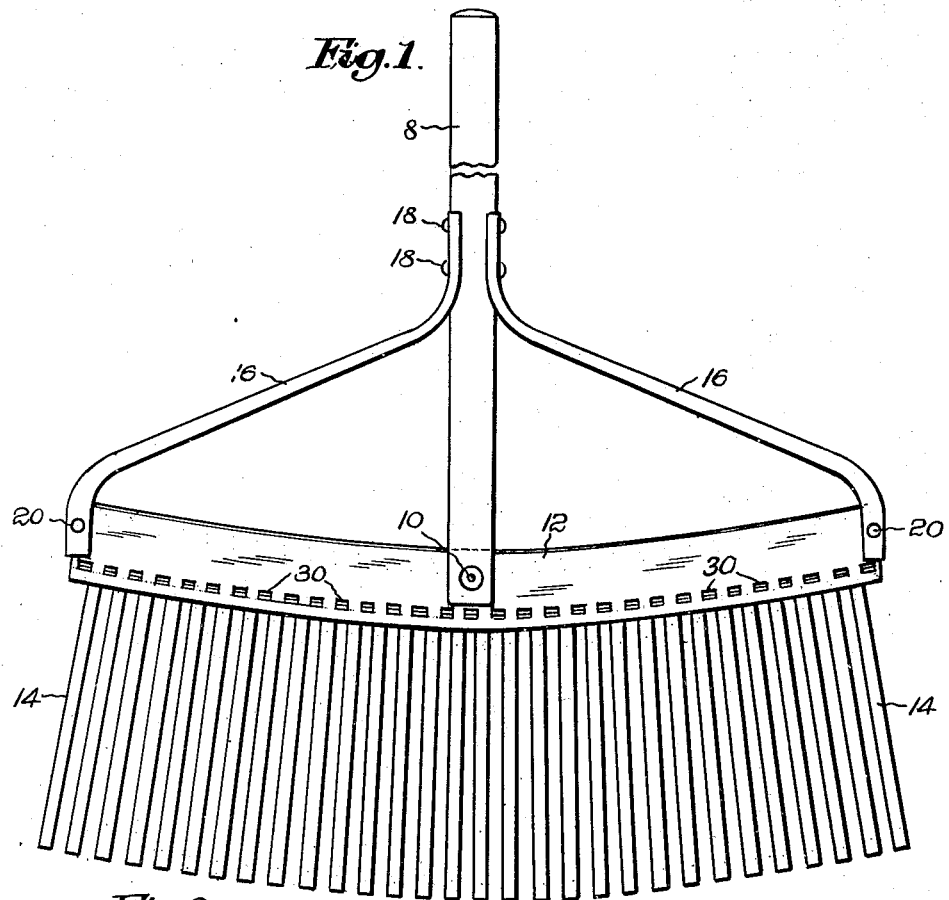
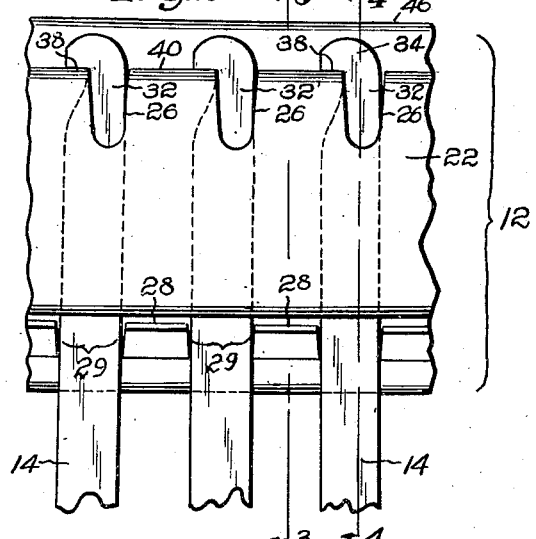
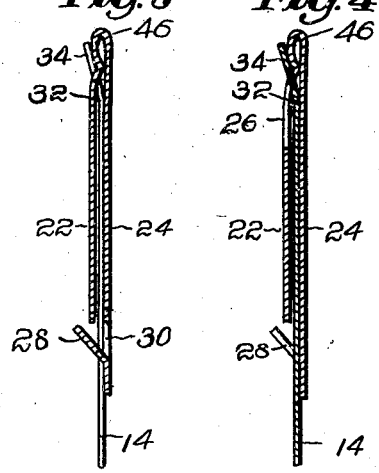
Inventor:
Frank D. Rugg Dec. 6, 1949 F. D. RUGG 2,490,710
RAKE
Filed Jan. 26, 1946 2 Sheets-Sheet 2
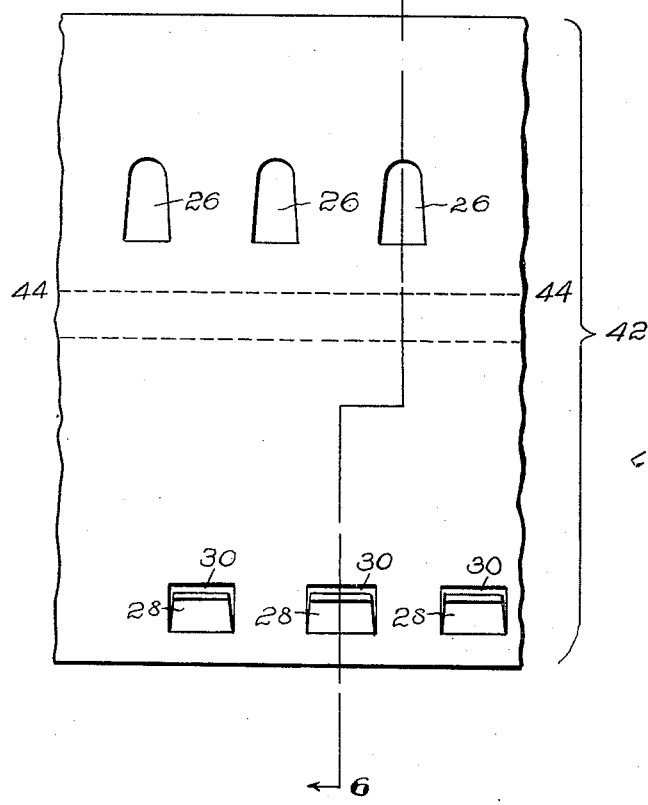
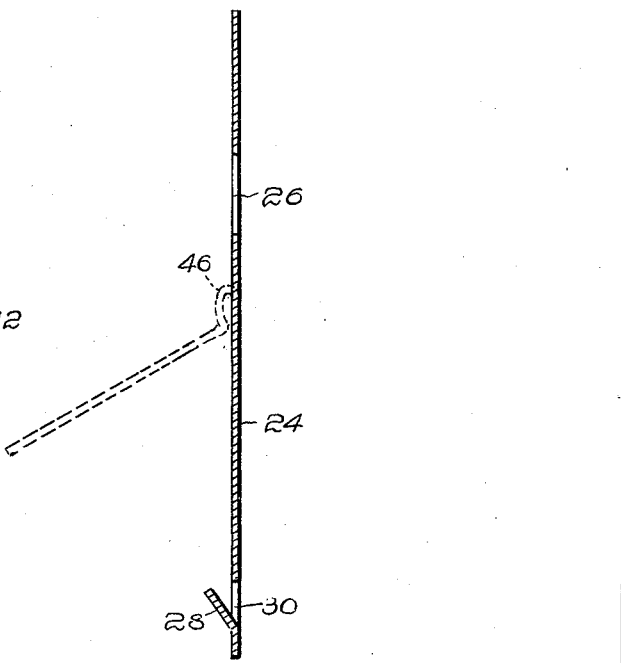
Inventor:
Frank D. Rugg,
Attys Patented Dec. 6, 1949

2,490,710

UNITED STATES PATENT OFFICE 2,490,710

RAKE

Frank D. Rugg, Greenfield, Mass., assignor to Rugg Manufacturing Company, Greenfield, Mass., a corporation of Massachusetts Application January 26, 1946, Serial No. 643,563

1 Claim. (Cl. 56—400.17)

This invention relates to rakes and is more especially though not exclusively concerned with lawn rakes of the broom type in which the tines are flexible. The invention aims generally to improve rakes of this class, and more particularly to provide a rake of great durability combined with simplicity, ease of assembly, and moderate cost, as well as other advantages which will appear during the course of the following description of one embodiment thereof, while its scope will be pointed out more particularly in the appended claim.

In the drawings:

Fig. 1 is an elevation of a rake embodying the invention;

Fig. 2 is an elevation of a portion of the rake on an enlarged scale;

Fig. 3 is a sectional view on line 3—3 of Fig. 2;

Fig. 4 is a sectional view on line 4—4 of Fig. 2;

Fig. 5 is an elevation of the perforated sheet which is to be folded to form the tine holder; and Fig. 6 is a sectional view on line 6—6 of Fig. 5.

Referring to the drawings and to the embodiment of the invention illustrated therein as an example, there is shown (see Fig. 1) a rake having a handle 8, such as a cylindrical bar of wood, to which there is secured, as by a rivet or bolt 10, a transverse bar 12 in the nature of a rake-head constituting a holder for tines 14. The head is suitably braced as by channel braces 16 suitably secured as by rivets or bolts 18 to the handle 8 and by rivets or bolts 20 to the bar 12. When, as in the present example, the rake is of the broom type used for lawns, the tines 14 are resilient and to that end are conveniently made of tempered strip steel.

The tines 14 are secured to the transverse bar or holder 12 by a novel construction now to be described, reference being had at first to Figs. 2, 3 and 4. The holder 12 comprises two walls 22 and 24 which embrace the tines 14, one wall, herein the wall 22, being provided with a set of openings 26 through which said tines extend. One wall, herein the wall 24, is provided with a set of projections 28 separated by spaces 29 through which the tines 14 extend. The projections 28 are conveniently formed by lancing the wall 24, forming openings 30 and tongues which are struck up to provide the projections 28.

The tines are immovable lengthwise because they are held in fixed position by an interlocking arrangement of the tines and the tine holder, now to be described, reference being had at first to Fig. 2. It will be observed that the openings 26 are narrower than the strip stock of which the tines 14 are made. Accordingly, the strip is cut and its width reduced as at 32 to form a neck whose width is such that it can be received in the opening 26, while above the neck there is a head 34 presenting a shoulder 38 contacting a shoulder 40 presented by the wall 22. It follows that the engagement of the shoulder 38 with the shoulder 40 prevents downward withdrawal of the tines 14. Upward movement of the tine is prevented by reason of the fact that the width of the neck increases downwardly.

Inasmuch as the width of the head 34 is greater than the width of opening 26, it is evident that suitable provision must be made for the introduction of the head through the opening during the assembly of the parts. This is conveniently accomplished by making the opening 26 elongated vertically and by first placing the tine edgewise against the rear wall 24, then moving the tine upwardly to its correct position, and finally turning the tine flatwise, while moving the front wall 22 rearwardly toward the rear wall.

Under some circumstances, it might be desirable to make the front wall 22 and the rear wall 24 as separate and distinct parts suitably secured together. I prefer to make them integral (see Figs. 5 and 6) as parts of a wide plate 42 and to fold the plate along a line 44—44 to produce a fold 46. This fold, by the way, (see Fig. 2) is a considerable distance above the openings 26 and above the heads 34 at the upper ends of the tines. Thus the fold presents a smooth, unobstructed edge along the top of the rake head. The die which does the folding squeezes the front wall 22 sharply inward to produce the shoulder 40 to receive the shoulders 38 on the heads 34 of the tines 14. This inward squeeze produces a slight bend and offset (see Figs. 3 and 4) in the neck 32 so that the head 34 does not lie in the same plane as the body of the tine. This further tends to resist upward movement of the tine. The net result is a structure combining simplicity, ease of assembly, and moderate cost.

Having thus described one embodiment of the invention, what I claim is:

In a rake, the combination of a set of generally flat resilient sheetmetal tines each having at one end a head and a neck defining a lateral shoulder between them, and a sheetmetal holder therefor extending longitudinally of the tine set and comprising two walls which embrace the tines, said walls having longitudinal generally parallel continuous marginal portions, one wall being provided with a longitudinal set of openings spaced from the longitudinal edges of the wall marginal portions, said openings receiving said tine necks but being so restricted as to prevent passage by the tine heads when the tines are laid flatwise with relation to the walls, the tine heads having their inner faces disposed flatwise against the outer face of the wall having said openings and being engaged by the shoulders defined by the tine heads, and one of the walls also being provided with a second longitudinally set of openings formed by spaced partially struck out portions, said openings being spaced from the adjacent marginal portion of the wall, and portions of each of the tines being received between said partially struck out portions and being supported flatwise by said adjacent marginal portion of that wall.

FRANK D. RUGG.

REFERENCES CITED

The following references are of record in the file of this patent:

UNITED STATES PATENTS

| Number | Name | Date |
|---|---|---|
| 1,869,647 | Anderson | Aug. 2, 1932 |
| 1,870,739 | Lambert | Aug. 9, 1932 |
| 2,087,499 | Borovicka | July 20, 1937 |
| 2,193,070 | Lambert | Mar. 12, 1940 |
| 2,313,691 | Whittenberger | Mar. 9, 1943 |